(No Model.) 6 Sheets—Sheet 1.

F. L. FULLER & G. H. GRISWOLD.
CASH REGISTER AND INDICATOR.

No. 420,554. Patented Feb. 4, 1890.

Fig. 3.

(No Model.) 6 Sheets—Sheet 6.

F. L. FULLER & G. H. GRISWOLD.
CASH REGISTER AND INDICATOR.

No. 420,554. Patented Feb. 4, 1890.

Witnesses
Inventors
Frederick L. Fuller
George H. Griswold
by their attorney
A. H. Hubbard

UNITED STATES PATENT OFFICE.

FREDERICK L. FULLER AND GEORGE H. GRISWOLD, OF WATERBURY, CONNECTICUT, ASSIGNORS TO THE UNION CASH REGISTER COMPANY, OF TRENTON, NEW JERSEY.

CASH REGISTER AND INDICATOR.

SPECIFICATION forming part of Letters Patent No. 420,554, dated February 4, 1890.

Application filed April 4, 1889. Serial No. 305,961. (No model.)

*To all whom it may concern:*

Be it known that we, FREDERICK L. FULLER and GEORGE H. GRISWOLD, citizens of the United States, residing at Waterbury, in the county of New Haven and State of Connecticut, have invented certain new and useful Improvements in Cash-Registers; and we do hereby declare the following to be a full, clear, and exact description of the invention, such as will enable others skilled in the art to which it appertains to make and use the same.

Our invention relates to certain new and useful improvements in cash registers and calculators, such as are used in keeping account of cash received from sales, and which are preferably operated in connection with a money-drawer which forms a part of the machine.

The objects of our invention are, first, to provide a machine which shall temporarily indicate the amount of each sale, so that the customer may see the same as it appears upon the face of the machine, and which shall, in addition to the temporary indication thus made, transfer the amount of said sale by a process of addition to a permanent totalizing-register, which may be inaccessible to the salesman, and which will at all times show the sum-total of sales to any person having access to the interior of the case without any calculation upon the part of the observer; second, to provide a machine in which any of the several parts of the permanent registering mechanism may be operated forward, but in which none of said parts is capable of any retrograde movement; third, to provide mechanism whereby upon the opening of the cash-drawer the indicating mechanism will return to its normal position and the said indication be effaced; fourth, to provide means for locking the next higher segment as against simultaneous operation with the one below it; fifth, to provide a construction which shall be cheap and simple in all its parts, certain in its action, and positive in operation as far as may be; and with these ends in view our invention consists in the construction and combination of operative elements hereinafter fully described, and then recited in the claims.

In order that those skilled in the art to which our invention appertains may more fully understand the construction and operation thereof, we will describe the same in detail, reference being had to the accompanying drawings, which form a part of this specification, and in which—

Like numerals and letters of reference denote the same parts in all the figures of the drawings.

The case in which the parts are inclosed consists of a base A, a back B, sides C, a cover D, preferably hinged at its rear end for ready access to the trains, and which may be provided with a lock, an apron E, having vertical slots through which the operating-segments project, and a table F, having openings through which the said segments and their handles may be turned freely downward.

Figure 4:
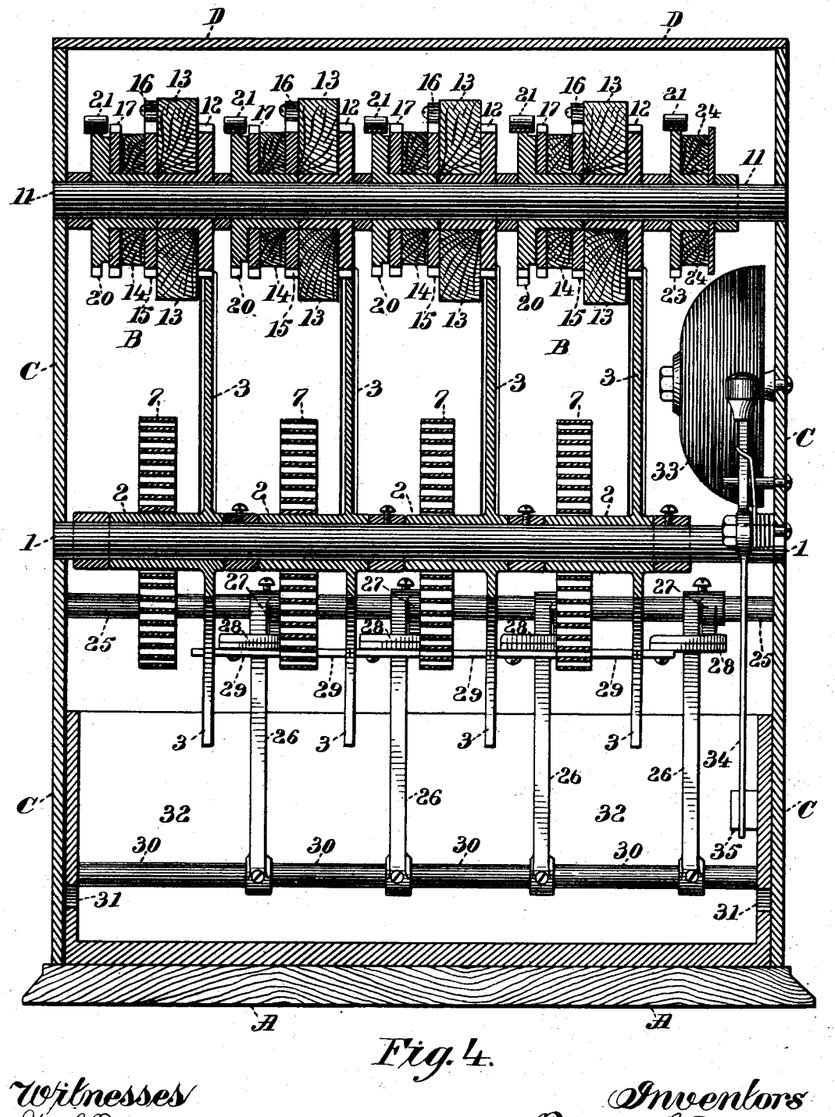
Fig. 4, a vertical section on the lines $y\ y$ of Figs. 2 and 5, and looking from the back of the machine.

1 is a shaft extending between the sides C of the case, and upon sleeves 2, journaled about said shaft, are mounted segments 3, each having teeth 4 upon a portion of its periphery in such manner as to form a sectoral rack. (See Figs. 4 and 5.) A portion of each segment (designated by 5) projects out through a slot in the apron, and secured in this projecting portion of each segment is a series of equidistantly-arranged operating-handles 6, to the number of nine when the machine is to be used for computation upon the decimal system, but which may be varied in number to adapt the machine for calculations in accord with any other plan of notation. Opposite to these handles (see Fig. 1) is a scale consisting of the numerals from 1 to 9, inclusive, said scale serving as a guide for the operator in manipulating the segments.

Figure 5:
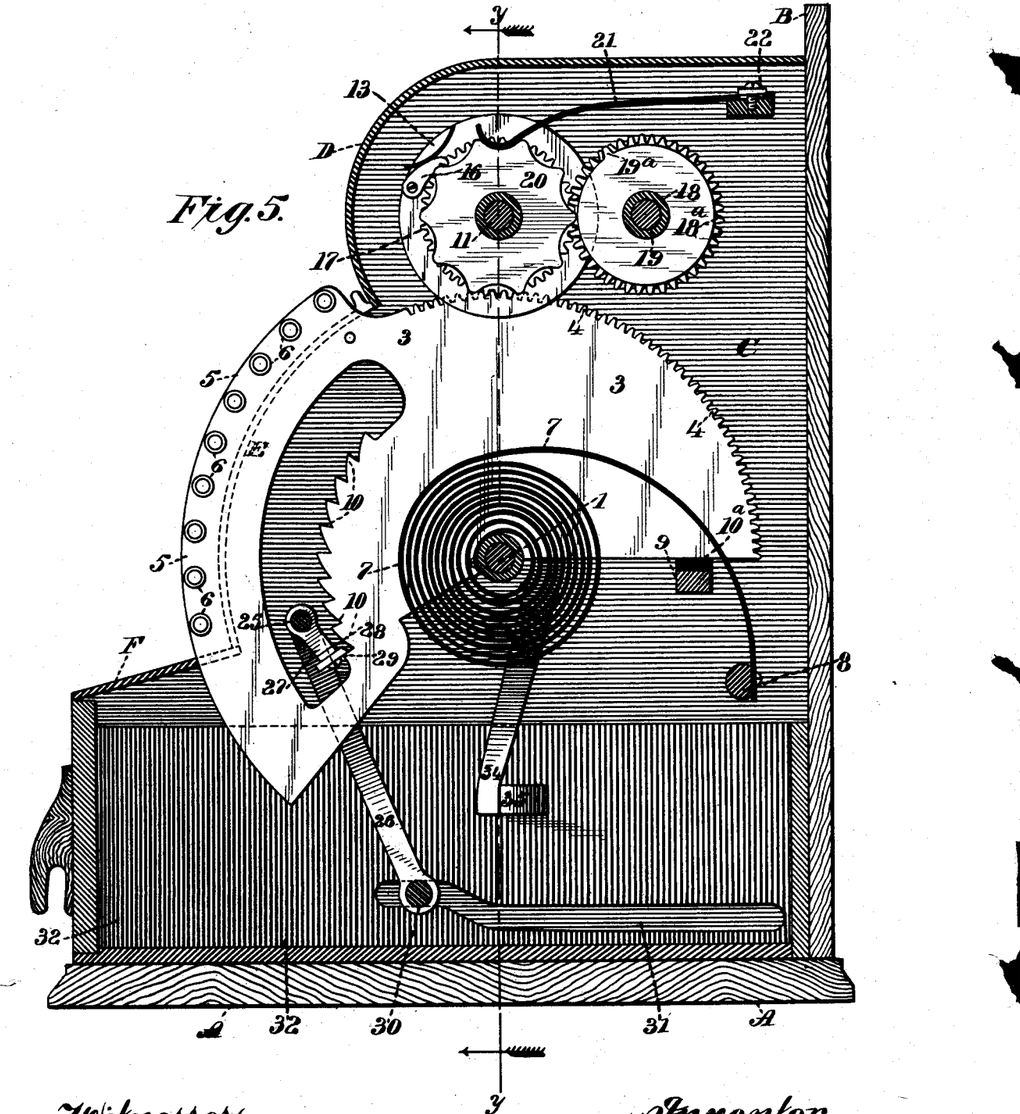
Fig. 5, a vertical section on the line $x\ x$ of Fig. 3.
Figure 6:
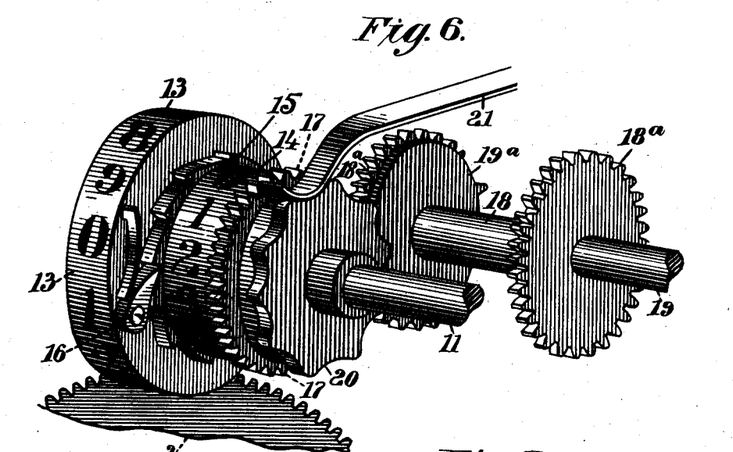
Fig. 6, a detail perspective of one train of the registry-wheels.

7 are coiled springs, each having one end thereof secured to a sleeve 2 and the other end secured to any fixed base—as, for instance, a transverse rod 8 near the rear of the case. The function of these springs is to return the segments to their normal position, as seen at Fig. 5, after they have been turned down and released. This normal position is determined by a stop 9, preferably containing a block 10$^a$, of rubber or other resilient material, to lessen the jar of the spring-impelled segment. Each segment has cut therein an opening, upon the inner edge of which is a series of teeth 10, arranged on a sector described from the center of the shaft 1. These teeth and the locking-clicks which engage therewith will be hereinafter more particularly referred to and described.

11 is a shaft extending across between the sides of the case above and in substantially the same vertical plane as the shaft 1. (See Fig. 5.) This shaft carries for each of the segments hereinbefore referred to a gear 12, whose teeth are engaged by the racked edge of the segment, and which has secured thereon and adapted to move therewith in both directions a wheel 13, having upon its periphery characters from 0 to 9, inclusive. The intermeshing gear and segment have an equal number of teeth, so that a quarter-turn of the segment effects a complete revolution of the gear.

Figure 2:
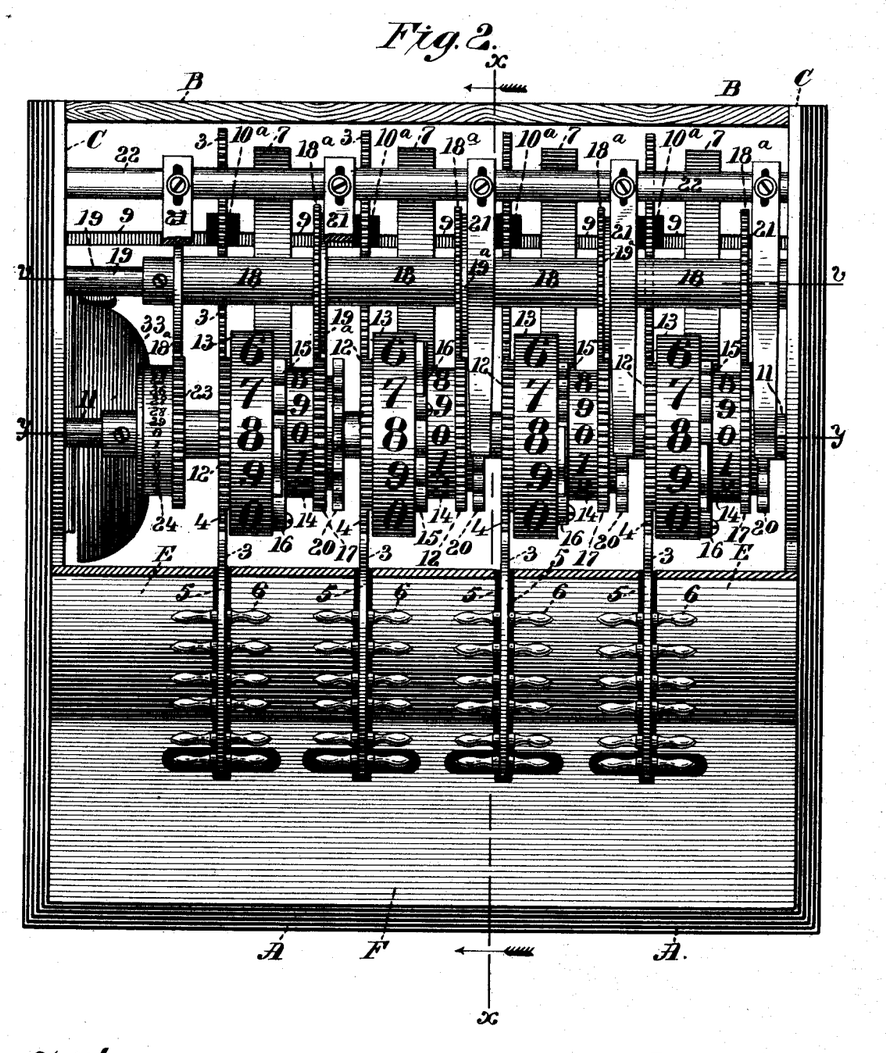
Fig. 2, a plan view with the upper part of the casing removed.
Figure 7:
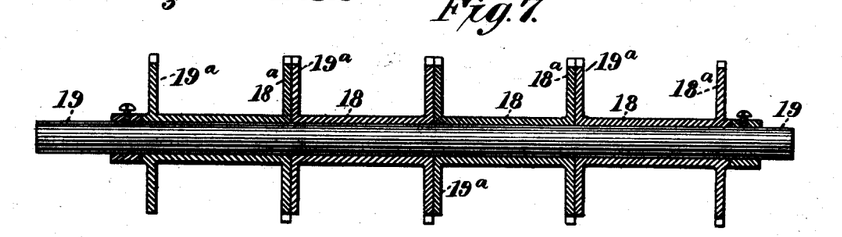
Fig. 7, a detail longitudinal section at line $v\ v$ of Fig. 2, showing the transfer-shaft and the gears carried thereon.
Figures 8, 9:
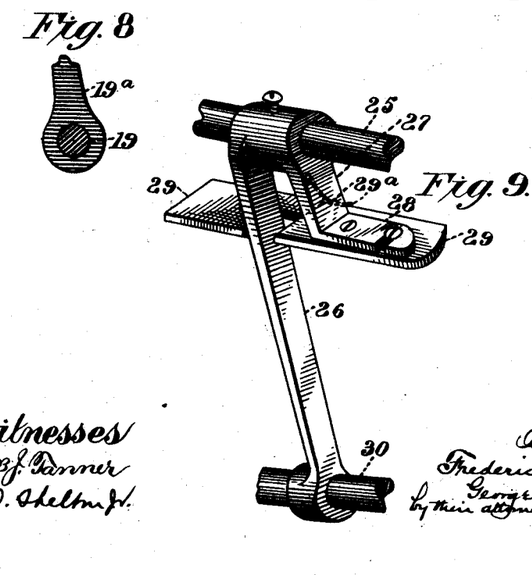
Fig. 8, a detail side elevation of a one-toothed transfer-pawl, which may be used in place of the one-toothed pinion on the transfer-shaft.
Fig. 9, a detail perspective of one of the locking-detents.

Journaled upon the shaft 11, alongside the numbered wheel 13 and independent thereof, is a second numbered wheel 14, which has formed therewith or secured thereto a ten-toothed ratchet-wheel 15. This ratchet-wheel is engaged by a spring-actuated pawl 16 upon the side of the wheel 13, so that it will be carried forward, as to the numerals thereon, with said wheel 13, but so that when the larger-numbered wheel is returned to its normal position the pawl will slide backward over the ratchet without in any wise operating the latter. Upon its other side the numbered wheel 14 carries a gear 17, meshing with a gear 18$^a$, equal in size and number of teeth, which latter is mounted upon a sleeve 18, journaled on a transverse shaft 19 in the rear of the shaft 11 and in substantially the same horizontal plane therewith. As seen at the detail sectional Fig. 7, the sleeve carries upon its other end a one-toothed pinion 19$^a$, which is adapted to engage at each revolution with the gear 17 in the train of the next higher series (see Fig. 2)—that is, the one-toothed pinion driven by the units-train operates the gear on the totalizing-register wheel of the tens-train, the one-toothed pinion upon the tens-train operates the gear of the hundreds-train, and so on, the hundreds the thousands, and the thousands the tens of thousands, if the machine be made of so great compass by the employment therein of a sufficient number of trains.

Beyond the gear 17 and adapted to turn therewith is a sinuous-faced detent-wheel 20, which is engaged by a frictional spring 21, secured to any convenient base—as, for instance, the transverse rod 22. This detent-wheel serves to prevent any displacement of the totalizing-register train, except when the latter is properly operated through movement of one of the segments. Thus it will be seen that the segments operate the large indicating-wheels both forward and backward. The temporary wheels operate to turn the smaller totalizing-register wheels forward, but never backward, and these wheels, through the gear and one-toothed pinion on the transfer-shaft 19, move the totalizing-register wheel of the next higher train one space for each complete revolution of the lower register-wheel and its gear.

The one-toothed pinion which is operated by the thousands-train engages a gear 23, which latter carries a register-wheel 24, having on its periphery a character for each tooth. This wheel registers tens of thousands up to thirty.

As this machine is adapted for the computation in money upon the decimal system, the capacity of the four lower trains is $99.99. The addition of the large wheel 24, above described, increases this capacity up to $3,000.00. Of course a greater number of trains may be employed; but, as single sales rarely run over $100.00 in amount, the computation of the totals with the aid of the large wheel is sufficient for all practical purposes.

Figure 3:
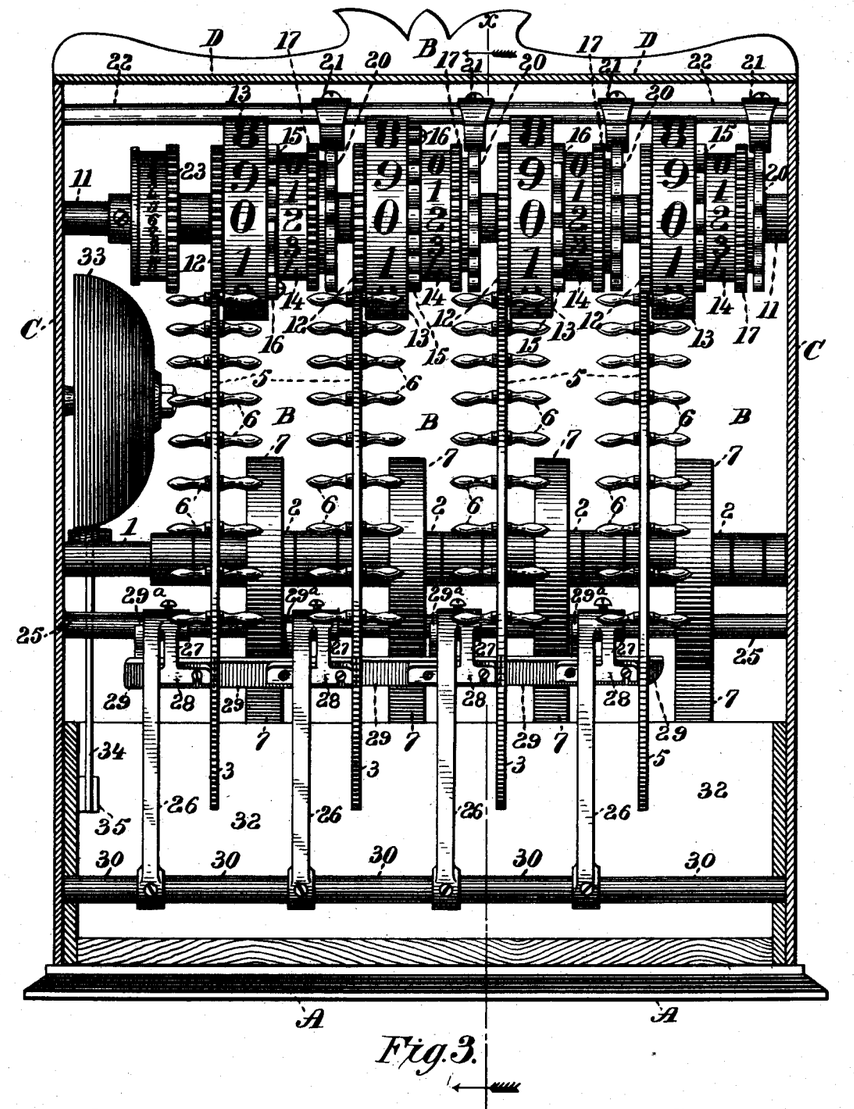
Fig. 3, a front elevation of the operative parts, the casing being removed.

25 is a shaft secured between the ends of the case near the front thereof, and rigidly attached to this shaft are bell-crank levers, each having a long arm 26 and a short arm 27. The short arms are each provided with a transversely-extended plate 28. Pivotally attached to each of these plates is a flat click 29, and each click, except the one shown as farthest to the left upon Fig. 3, engages the sectoral rack upon two of the pivoted segments—that is to say, the first click engages the edge of the rack on the units and also on the tens segment, the second the tens and hundreds, the third the hundreds and thousands. Each click is provided with a spring of any ordinary construction, as 29$^a$, which serves to keep said click parallel with the plate on which it is mounted and with its ends normally engaged with the teeth on two segments to about one-half the depth of said teeth. When one of the segments—say the units—is depressed, the teeth on its sector turn the click on its pivotal point, so that they may pass it, and this ejection of one end of the click from the sector-teeth causes its other end to engage the teeth on the next segment to the full depth thereof. The object of this arrangement of the clicks is to prevent the simultaneous depression of the two adjacent segments, and is for the reason that if the operator could know by any means that the one-toothed pinion of the units-train was about at the next turn to operate the register-wheel of the tens-train one step he might by the depression of the two segments simultaneously cause the one-toothed pinion to pass through the gear on the tens-train without carrying thereto the one step of the tens-wheel due to a full turn of the units-wheel. To make this clear, for example, the total of sales registered is nine cents. The one-toothed pinion is then ready to transfer its one turn to the tens-train. Twenty-five cents have been paid the salesman. He might depress the units-segment five points and simultaneously the tens-segment two points. The two points on the tens-segment would be registered on the tens-register wheel by the pawl; but the movement of the units-wheel would have thrown the one-toothed pinion into engagement with the gear in the tens-train, and the two-points movement of the latter would have carried said pinion through and past the gear without the latter receiving the register of the transfer which said pinion should have made thereon. It is to obviate such a contingency that each segment is locked as against movement simultaneous with the one next it on each side.

Figure 1:
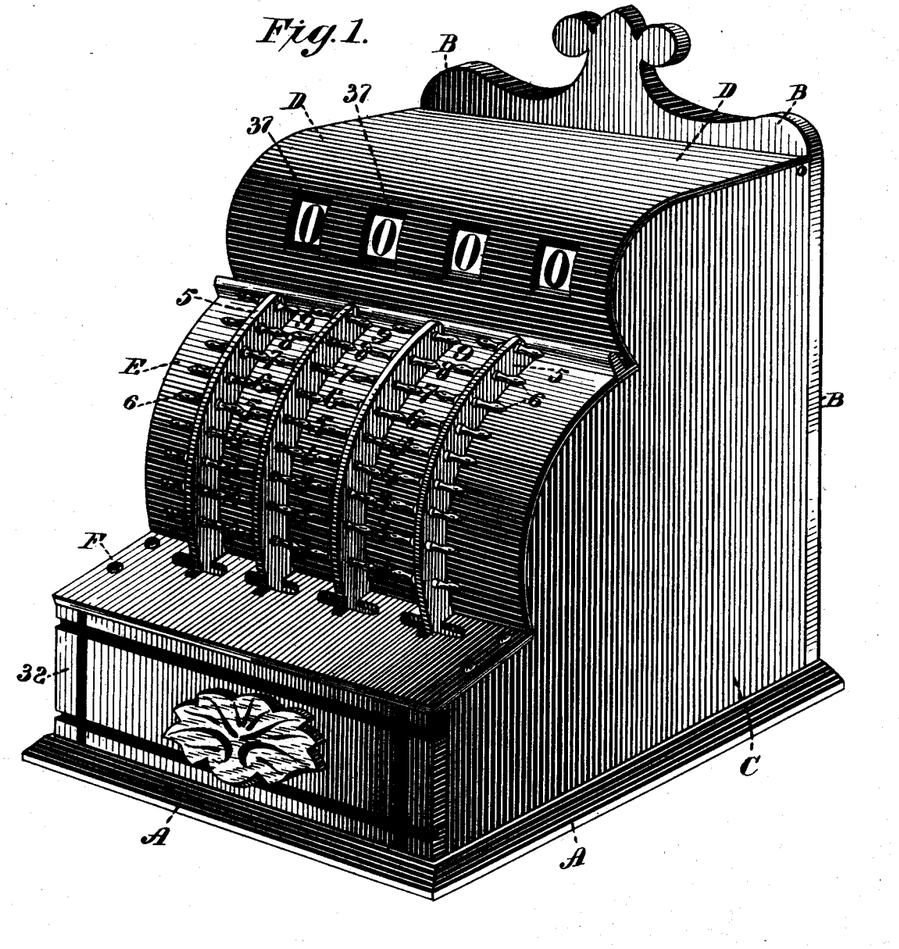
Figure 1 is a perspective of the complete machine.

The ends of the long arms of the bell-crank levers are secured to a rod 30, whose ends engage a cam-slot 31 in each side of the money-drawer 32, which is free to slide in the base of the machine. The purpose of this connection is to cause the withdrawal of the drawer to turn the shaft to which all the bell-cranks are secured to a sufficient degree to remove all the clicks out of engagement with the sector-teeth, and so allow each and every segment to return to its normal position, as seen at Figs. 1 and 5. The closing of the drawer restores the clicks into engagement with the segments.

A signal-bell 33, whose hammer-lever 34 projects downward below the level of the top of the drawer, is operated at each opening of the drawer by means of a stop 35, over which the said lever rides when the drawer is closed. As this bell mechanism may be of any ordinary construction, and is, moreover, common to cash-registers, it is needless to describe it in detail.

In the operation of the machine organized as above described the operator places his fingers upon the appropriate handle of the proper segment and depresses said segment until the fingers come in contact with the table. This causes the amount corresponding to the handle selected to appear upon the indicating-wheel, which shows through the appropriate opening 37 in the case. It also causes the same amount to be added to the totalizing-register, and the segment is retained in the position to which it has been carried by the engagement with the sector-teeth thereon of the spring-actuated clicks. Of course in registering uneven amounts the depression of more than one segment is required—say for $3.47 the units-segment is pressed downward from seven, the tens from four, and the hundreds from three, which may be done freely so long as it is not sought to depress them simultaneously. Even amounts are indicated and registered by means of one segment only. For instance, for eight cents, the units-segment is depressed from eight; for eighty cents, the tens-segment from eight; for eight dollars, the hundreds-segment from eight, &c. When the drawer is opened, the cam-slots therein, by moving the rod which operates the clicks, causes these latter to be disengaged from the segments, which, carrying with them the indicating-wheels, return to their normal positions.

While the indicating-wheels are always at zero, except at such times as they are depressed and so retained by the clicks, the totalizing-register has added to it at each operation of the segments, or any of them, the amount thereby caused to appear upon the indicating wheel or wheels. The person having access to the interior of the case may therefore obtain the full amount of sales at any time by reading as a total the figures on the totalizing-register wheels which are in the line for totals, which line may be indicated by marks upon the sides of the case or in any other desired manner.

When at any time it is desired to turn the totalizing-register to zero for commencing a new account upon the machine, it is only necessary to turn each totalizing-register wheel, beginning with units, by means of its segment, until it stands at zero.

In this our invention we do not wish to be confined to the exact details of construction which we have herein shown and described, since many minor changes entirely within the province of mechanical skill may be made therein without departing from the spirit of our invention, which is founded upon the use of the segments and the indicating-wheels operated in both directions thereby and the totalizing-register operated through and by means of the indicating-wheels.

We claim—

1. In a cash-register or the like, the combination, with a plurality of peripherally-toothed actuating-segments, each having thereon a series of handles whereby it may be moved about its center, of a series of indicating-wheels engaged and turned in both directions by said segments, and a totalizing-register train operated upward only as to the numbers thereon by the indicating-wheels, substantially as described.

2. In a cash-register or like machine, the combination, with a plurality of pivoted and partially-rotatable segments having peripheral actuating-teeth, of operating-handles secured upon and adapted to move with said segments, a series of indicating-wheels each engaged and operated in both directions by one of the segments, and a totalizing-register train whose members are operated upward only, numerically, by the indicating-wheels, substantially as set forth.

3. The combination, in a cash-register or the like, with the pivoted and peripherally-toothed segments, each having upon one edge thereof a series of operating-handles affixed thereto and carried thereby, of the indicating-wheels operated both forward and backward by said segments, the totalizing-register train operated upward, numerically, from the indicating-wheels, and means, as described, for the transfer of the revolutions of each wheel of the totalizing-register to that numerically next above it, substantially as set forth.

4. In a cash-register or the like, the combination, with the toothed and pivoted segments, of the sectorally-arranged and equidistantly-spaced handles secured thereon and whereby the segments may be operated, the indicating-wheels driven in both directions by the toothed edges of the segments, the totalizing-register wheels operated from the indicating-wheels, and a series of springs, one engaging each segment and adapted to return said segments and the indicating-wheels to their zero position after the total has been registered, substantially as described.

5. In a cash-register or similar machine, the combination, with the indicating-wheels movable in both directions and the totalizing-register operated from said indicating-wheels, of the pivoted and peripherally-toothed segments engaging the indicating-wheels, a series of locking-teeth independent of the driving-teeth and arranged sectorally upon the segments, a series of clicks adapted to engage said locking-teeth and thereby retain the segments and indicating-wheels in any desired position, and means, as described, whereby all the clicks may be simultaneously withdrawn out of engagement and the segments left free to be returned to their zero position, substantially as set forth.

6. In a cash-register or similar machine, the combination, with the toothed and pivoted operating-segments and the indicating mechanism actuated thereby, of a series of locking-clicks, each of said clicks adapted to engage two of said segments, substantially as shown and described.

7. In a cash-register or similar machine, the combination, with the toothed and pivoted operating-segments and the mechanism actuated thereby, of a series of locking-clicks engaging teeth upon the segments, movable levers connected to and carrying said clicks, and means for operating said levers so as to withdraw all of said clicks simultaneously out of engagement with the segments, whereby the latter are released and left free to return to their normal position, substantially as set forth.

8. In a cash-register or similar machine, the combination, with the operating-segments and the indicating devices operated thereby, of the bell-crank operating-levers arranged in a line parallel to the edges of the segments and movable toward and away from said segments, and a series of independent locking-clicks pivotally secured one to each of said levers and adapted to engage and hold the segments, substantially as set forth.

9. In a cash-register or like machine, the combination, with the operating-segments and the mechanism operated thereby, of the bell-crank levers secured on and adapted to move with a shaft extended transversely of the machine parallel with the edges of the segments, and a series of pivoted clicks mounted one upon each bell-crank, each click extended between and adapted to engage two of the segments, substantially as and for the purpose set forth.

10. In a cash-register or like machine, the toothed operating-segments having handles secured thereto, as described, and provided with sectorally-arranged locking-teeth, of the bell-crank levers arranged parallel to the edges of the segments, clicks carried by the bell-cranks and adapted to engage the sector-teeth, and cam-slots engaging and adapted to operate the bell-cranks toward and away from the sector-teeth, whereby the clicks may be engaged with or disengaged from said teeth, substantially as set forth.

11. In a cash-register, the combination, with the indicating and registering devices, of the segments pivoted within the case, the peripheral driving-teeth upon said segments, the sectorally-arranged locking-teeth, whose arc is struck from the same center as the driving-teeth, but with shorter radius, and detents engaging said locking-teeth, substantially as set forth.

12. In a cash-register, the combination, with the indicating and registering mechanism, of the operating-segments having the peripherally-arranged teeth engaging and adapted to drive the indicating-wheels in both directions, the operating-handles secured upon and movable only with the segments, and a series of locking-teeth independent of the peripheral driving-teeth, and suitable clicks for engaging said locking-teeth, substantially as set forth.

13. The combination, in a cash-register or like machine, with the segments and the mechanism operated thereby, of the drawer having cam-slots therein and the series of lever-operated clicks interposed between the drawer and the segments and controlled as to their engagement with said segments by the position of the drawer, substantially as set forth.

14. The combination, in a machine of the character described, with the operating-segments, of the bell-crank levers, the pivoted locking-clicks carried thereby, a connection, as a rod, between the bell-cranks, and the movable drawer, the latter having cam-slots engaging and adapted to operate said rod, and thereby the bell-cranks and clicks, substantially as specified.

15. In a machine of the character described, the combination, with the indicating and totalizing mechanism, of the pivoted segments having peripheral teeth, whereby the registering mechanism is actuated, the locking-teeth arranged upon said segments, a series of locking-clicks, each taking into the locking-teeth of the two adjacent segments, whereby said segments or any of them may be retained as against their returning-springs, and a connection between said detents and the money-drawer, whereby upon the opening of the drawer all of said clicks are withdrawn out of engagement with the segments, substantially as described.

16. In a cash-register or similar machine, the combination, with the pivoted and peripherally-toothed operating-segments and the handles stationary upon but moving with said segments, of the indicating-wheels operated in both directions by said segments, the totalizing-register devices operated upward only by said indicating-wheels, and the series of gears and one-toothed pinions arranged upon a separate shaft, the gears driven by the register-wheels, and each pinion adapted at each revolution of the register-wheel whereby it is driven to transfer said revolution to the next higher register-wheel as one step of the latter, substantially as set forth.

17. In a machine of the character described, the combination, with the toothed and pivoted operating-segments, of the indicating-wheels driven thereby in both directions, the totalizing-register wheels axially aligned with and driven by said indicating-wheels in one direction, a series of gears arranged behind and operated one by each register-wheel, and one-toothed pinions carried by said gears and each engaging and adapted to turn the register-wheel of the next higher train one step for each complete revolution of the pinion, substantially as specified.

18. The combination, in a machine of the character described, of a series of toothed segments, each provided with a series of operating-handles and all journaled independently upon the same shaft, a series of indicating-wheels operated by said segments, a totalizing-register actuated by said indicating-wheels, a transfer-pinion operated by each of the register-wheels and acting upon the register-wheel of the next series, and a series of retaining-clicks, each having a limited independent movement and adapted to engage two of the segments, and means, substantially as described, under control of the cash-drawer, whereby all the said clicks may be simultaneously thrown into or out of contact with the segments, substantially as described.

19. In a machine of the character described, the combination, with the operating-segments, of a series of registering-trains, each consisting of an indicating-wheel driven by the segment in both directions, a registering-wheel in line with and driven from said indicating-wheel by a pawl, a gear and detent wheel fast upon said registering-wheel, and a sleeve arranged upon an independent shaft and carrying a gear actuated from gear 17, and a one-toothed pinion meshing with the gear 17 on the next higher registering-wheel, substantially as set forth.

20. The combination, in a machine of the character described, of the shaft 1 and the spring-actuated operating-segments arranged to turn independently thereon, the shaft 11 and the indicating and registering wheels carried thereby, the latter actuated by the former, substantially as described, the shaft 19, carrying the transfer-gear $18^a$ and the one-toothed pinion $19^a$, the shaft 25, having arranged thereon the clicks for engagement with the segments, and the rod 30, operated by the drawer, whereby the engagement and disengagement of the locking-clicks are effected, substantially as and for the purpose described.

21. In a machine of the character described, the combination, with the indicating and totalizing mechanism, of the segments having the peripheral driving-teeth, having also the equidistantly-arranged operating-handles fast thereon and moving therewith, having also the locking-teeth independent of the driving-teeth and arranged one for each of the handles, and locking-clicks adapted to engage said teeth, substantially as set forth.

22. In a machine of the character described, the combination, with the indicating and totalizing mechanism, of the peripherally-toothed segments engaging and adapted to drive said mechanism, handles secured upon said segments and accessible from without the case, a series of locking-teeth equal in number to the handles and concentric with the arc in which said handles are disposed, and locking-clicks under control of the money-drawer, and which are normally within the line of the locking-teeth, substantially as specified.

23. In a machine of the character described, the combination, with the toothed operating-segments and the mechanism operated thereby, of a shaft whereon all of said segments are journaled, coiled springs, each having one end attached to one of the segments and the other to a fixed point, the sectoral rows of locking-teeth, one upon each of the segments, and the pivoted clicks engaging said locking-teeth, substantially as set forth.

24. In a machine of the character described, the combination, with the peripherally-toothed operating-segments, of the indicating-wheels driven thereby in both directions, the register-wheels axially aligned with said indicating-wheels; the ratchets carried by the register-wheels, the pawls carried by the indicating-wheels and adapted upon the forward movement of the latter to turn the register-wheels, and a transfer mechanism, substantially as described, whereby at each full revolution of each register-wheel the register-wheel of the next higher series is advanced one step, substantially as specified.

25. The combination, in a machine of the character described, with the operating-segments having peripheral driving-teeth, of the indicating-wheels engaged and driven by said segments in both directions, the register-wheels axially aligned with said indicating-wheels, a ratchet and gear arranged against and carried by each register-wheel, a pawl upon each indicating-wheel engaging said ratchet, an independently-journaled gear meshing with the gear carried by the register-wheel, and a one-toothed pinion carried by each of such independently-journaled gears and engaging once at each revolution with the gear on the next higher register-wheel, substantially as set forth.

In testimony whereof we affix our signatures in presence of two witnesses.

FREDERICK L. FULLER.
    GEORGE H. GRISWOLD.

Witnesses:
 S. H. HUBBARD,
 M. C. HINCHCLIFFE.